(No Model.)
J. F. AUCOIN.
CANE SCRAPER.
No. 446,805. Patented Feb. 17, 1891.
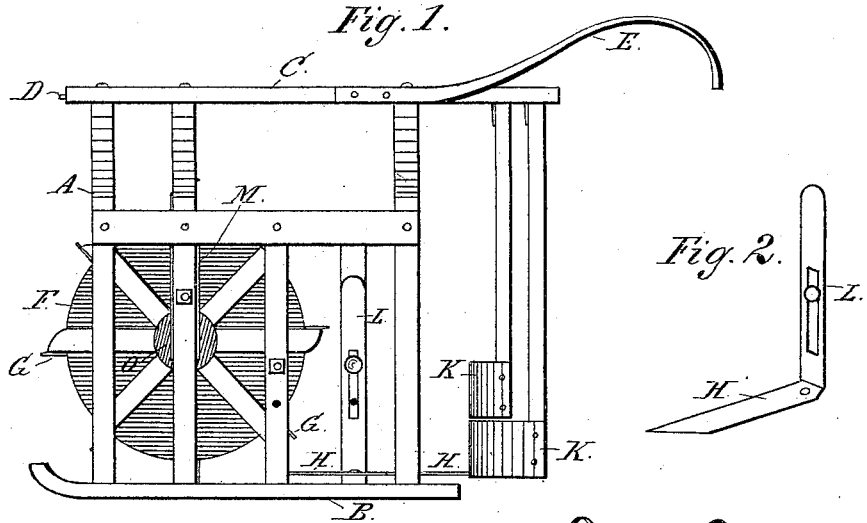
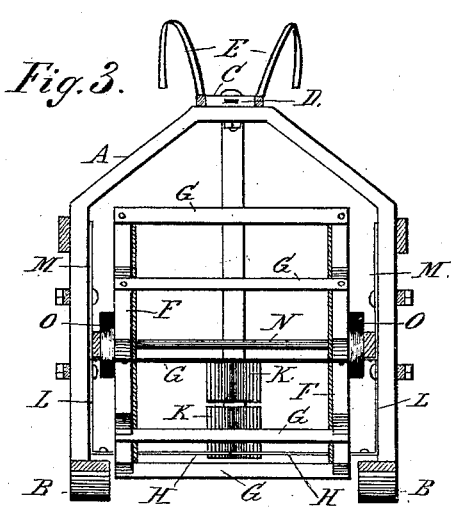
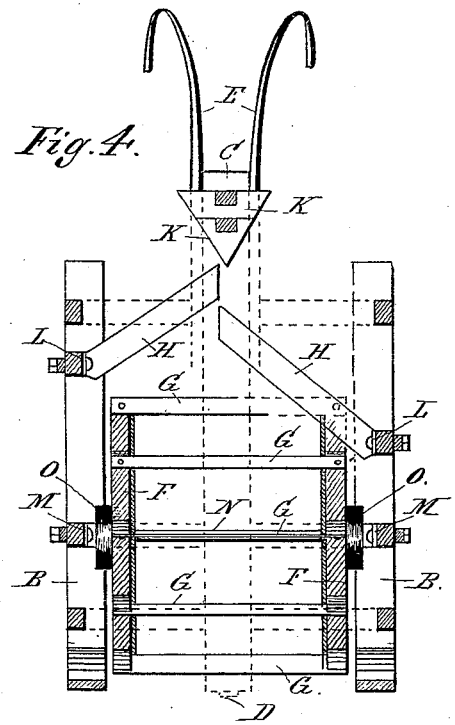
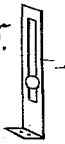
WITNESSES
Helmuth Holtz
Percy D. Parks
INVENTOR
Joseph F. Aucoin
by W. R. Stringfellow
Attorney

UNITED STATES PATENT OFFICE.

JOSEPH FRANCOIS AUCOIN, OF PLATTENVILLE, LOUISIANA.

CANE-SCRAPER.

SPECIFICATION forming part of Letters Patent No. 446,805, dated February 17, 1891.

Application filed July 5, 1890. Serial No. 357,895. (No model.)

*To all whom it may concern:*

Be it known that I, JOSEPH FRANCOIS AUCOIN, a citizen of the United States, residing at Plattenville, in the parish of Assumption and State of Louisiana, have invented certain new and useful Improvements in a Cane-Scraper; and I do declare the following to be a full, clear, and exact description of the invention, such as will enable others skilled in the art to which it appertains to make and use the same.

My invention relates to an improvement in a cane-scraper, and its novelty will be fully understood when taken in connection with the following description and annexed drawings; and the objects of my invention are to provide a device that will remove the grass and weeds from plant cane and loosen the soil covering same. I attain these objects by the mechanism illustrated in the accompanying drawings, in which—

Figure 1 is a side view. Fig. 2 is a perspective side view of knife attached to slide. Fig. 3 is a front view. Fig. 4 is a sectional top view showing knives in position. Fig. 5 is a side view of slide for raising or lowering wheel.

Similar letters refer to similar parts throughout the several views.

In the drawings, A refers to a frame placed upon runners B, which are similar to those used on a sled.

C is a beam which extends the entire length of frame A, and at a point indicated by D is an attachment for a single or double tree.

E are handles or shares.

F is a wheel to which blades G are attached.

H are knives which are attached to rear portion of frame in such a manner as to enable same to be raised or lowered.

K are flukes placed one above the other and attached to beam C in the manner shown in Fig. 1.

L are metal slides adjusted on each side of frame A, and to which knives H are attached.

M are metal slides placed on each side of frame A, and by means of which wheel F may be raised or lowered.

N is a shaft of wheel F, and upon which are placed collars O.

In operating my invention one or two animals can be employed by simply attaching a single or double tree to D. The runners B are placed in the furrows on each side of a cane-row. The wheel F is placed at any desired height by means of metal slides M, and the knives H may be set at any elevation that may be required, but preferably at an elevation that will enable knives to cut, say, two inches under the soil. The driver of team occupies a position between the shares E, and when a forward movement is made wheel F rotates and blades G come in contact with grass or weeds growing upon cane-row and cuts same. The knives H pass just under the soil on top of cane-row and loosen same, and the flukes K throw grass and weeds to each side of cane-row.

A striking advantage of my invention is the saving of labor, as with one of my machines fifteen acres of land planted in cane may be cleared of grass and weeds in one day, which heretofore in the same space of time required twelve men with hoes to perform the work.

Having described my invention, what I claim, and desire to secure by Letters Patent, is—

In a cane-scraper such as described, a wheel placed within a frame, with adjustable bearings for raising or lowering the same in such a manner as to regulate the depth of cut of the blades, in combination with knives attached to said frame and adjusted in rear of the wheel, with adjustable bearings for raising or lowering the knives and regulating the depth of cut of the blades under the soil, as set forth.

In testimony whereof I affix my signature in presence of two witnesses.

JOSEPH FRANCOIS <sup>his</sup> ✕ <sub>mark</sub> AUCOIN.

Witnesses:
HELMUTH HOLTZ,
PERCY D. PARKS.